United States Patent [19]

Claussen et al.

[11] Patent Number: 5,272,259

[45] Date of Patent: Dec. 21, 1993

[54] STILBENE DYESTUFFS AND LIGHT-POLARIZING FILMS OR SHEETS CONTAINING STILBENE

[75] Inventors: Uwe Claussen, Leverkusen; Friedrich W. Kröck, Odenthal, both of Fed. Rep. of Germany

[73] Assignee: Bayer Aktiengesellschaft, Leverkusen, Fed. Rep. of Germany

[21] Appl. No.: 890,332

[22] Filed: May 26, 1992

Related U.S. Application Data

[63] Continuation of Ser. No. 594,535, Oct. 9, 1990, abandoned, which is a continuation of Ser. No. 449,036, Dec. 11, 1989, abandoned.

[30] Foreign Application Priority Data

Dec. 23, 1988 [DE] Fed. Rep. of Germany ....... 3843414
Jul. 1, 1989 [DE] Fed. Rep. of Germany ....... 3921678

[51] Int. Cl.$^5$ .................... C09B 56/04; C09B 35/215; G02B 1/08
[52] U.S. Cl. .................... 534/689; 534/691; 8/506; 8/648; 252/585; 359/491
[58] Field of Search ............... 534/689, 691; 252/585; 359/491; 8/506

[56] References Cited

U.S. PATENT DOCUMENTS

| 2,821,550 | 1/1958 | Strobel . | |
|---|---|---|---|
| 3,310,551 | 3/1967 | McLeod | 534/689 X |
| 4,169,832 | 10/1979 | Wicki et al. | 534/689 |
| 4,490,151 | 12/1984 | Brode | 534/691 X |
| 4,514,559 | 4/1985 | Sato et al. | 534/689 X |
| 4,620,875 | 11/1986 | Shimada et al. | 106/22 |
| 4,774,141 | 9/1988 | Matsui et al. | 428/522 X |
| 5,007,942 | 4/1991 | Claussen et al. | 428/1 |

FOREIGN PATENT DOCUMENTS

| 0035152 | 9/1981 | European Pat. Off. . | |
|---|---|---|---|
| 3512836 | 10/1985 | Fed. Rep. of Germany | 534/691 |
| 1161300 | 11/1955 | France . | |
| 60-156759 | 8/1985 | Japan | 534/689 |
| 60-168743 | 9/1985 | Japan | 534/689 |

*Primary Examiner*—Mary C. Lee
*Assistant Examiner*—Fiona T. Powers
*Attorney, Agent, or Firm*—Sprung Horn Kramer & Woods

[57] ABSTRACT

Dyestuffs which in the form of the free acid conform to the formula

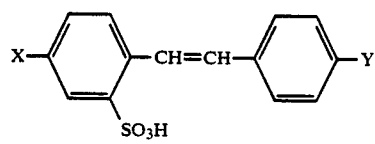

I in which

X and Y independently represent $-N=N-R$, $-CF_3$, $-CONH_2$, $-CONHR^1$, $-CONR^1R^2$, $-COOH$, $-COOR^1$, $-CN$, $-NO_2$, $-NH_2$, $-NHR^1$, $-NR^1R^2$, $-OH$, $-OR^1$, $-R^1CONH-$, $-O-CO-R^1$, halogen or a substituted or unsubstituted heterocyclic radical, provided that at least one of the radicals X or Y represents $-N=N-R$, in which R represents an aryl or heterocyclic radical, and $R^1$ and $R^2$ independently represent alkyl, cycloalkyl, aryl or aralkyl, which are uninterrupted or interrupted by O, S or both O and S, and in which furthermore the radicals mentioned for R, $R^1$ and $R^2$ are unsubstituted or substituted, the dyestuff contains a maximum of eight azo bridges, and with the exception of the dyestuff which, in the form of its free acid, conforms to the formula I wherein

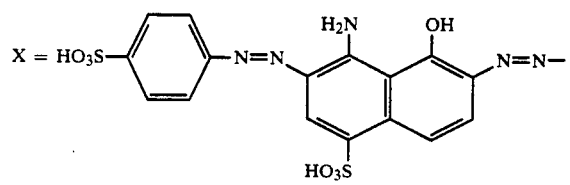

and (Abstract continued on next page.)

-continued
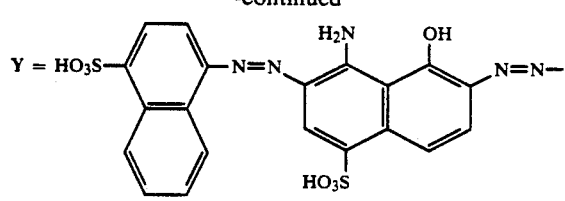
and light-polarizing films or sheets containing an organic polymer, preferably a vinyl alcohol homopolymer or copolymer, and dyestuff I.
6 Claims, No Drawings

STILBENE DYESTUFFS AND LIGHT-POLARIZING FILMS OR SHEETS CONTAINING STILBENE

This application is a continuation of application Ser. No. 594,535, filed Oct. 9, 1990, now abandoned, which is a continuation of application Ser. No. 499,036, filed Dec. 11, 1989, now abandoned.

The invention relates to stilbene dyestuffs and light-polarizing films or sheets, containing stilbene dyestuffs.

Films based on polyvinyl alcohol (PVA) containing iodine or dichroic dyestuffs as polarizing agents are known.

Until now, it has been very predominantly the iodine-containing polarizers which have found industrial applications, for example in passive liquid crystal displays for the visualization of information. In the absence of moisture, these polarizers are characterized by excellent light fastness and outstanding dichroic properties in the long-wave region of the visible spectrum. The active agent of these films is the iodine/PVA complex (M.M. Zwick. J. Appl. Polym. Sci. 9, 2393-2424 (1965)), which admittedly absorbs a wide band of the daylight spectrum, but not all of it. In the short-wave region, a "hole", i.e. a region of diminished extinction, is present, which is the reason that the sheets have a characteristic blue colour.

This has disadvantageous consequences, if it is desired to produce white light. The light transmitted in unpolarized form diminishes the dichroism and thus the polarization performance in this region. To increase it again, it is necessary to increase the concentration of iodine complex. However, this correction in the short-wave region results in excessive extinction in the long-wave region. This leads to a significant decrease of the transmitted light in the transmission setting in combination with a decrease in the brightness of the display which is equipped with this sheet. To achieve acceptable degrees of brightness, compromises must be made.

An important critical parameter of a display is its readability under various illumination conditions; it is usually stated as "perceived contrast ratio" (PCR=T⊥/T∥); this ratio should be as large as possible. From this follows that the transmission on the one hand has to made as small as possible in the blocked setting (T∥) (readability in the dark) and, on the other hand as large as possible in the transmission setting (T⊥) (readability in the light). This requires a very uniform polarizing performance of the filter over the entire spectral range, which can usually not be achieved by means of the iodine sheet.

There has not been a lack of attempts to replace iodine by dyestuff triples of dichroic dyestuffs to produce a neutral grey colour having a uniform dichroism.

However, this requires a range of high-performance dyestuffs. In addition to good light and weather fastness, they must have a high extinction and a high dichroism in the matrix; in addition, they must not have secondary densities which have lower dichroism. Thus, preferably polyazo dyestuffs have been proposed (JA 59/145,255, JA 60/156,759, JA 60/168,743). However, although dichroism is a wide-spread property with dyestuffs (cf. W. Hanle, H. Scherer, Zeitschr. Naturforsch. 6a, 437-439 (1951)), it has sofar not been possible to achieve or surpass the spectral properties of the iodine sheet. This can be attributed, on the one hand, to the lack of good blue shades, and, on the other hand, to the requirement of high dichroism of the system dyestuff/matrix.

Surprisingly, it has now been found that certain novel stilbene dyestuffs have excellent dichroic properties and are highly suitable for the production of light-polarizing films or sheets.

In what follows, a definition of a radical or index once given is maintained in the further text).

The invention accordingly relates, in one aspect, to dyestuffs which, in the form of their free acid, conform to the formula

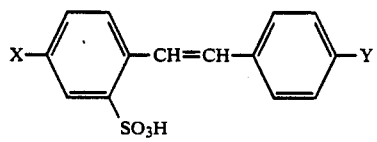

in which
X, Y signify —N=N—R, —CF$_3$, —CONH$_2$, —CONHR$^1$, —CONR$^1$R$^2$, —COOH, —COOR$^1$, —CN, —NO$_2$, —NH$_2$, —NHR$^1$, —NR$^1$R$^2$, —OH, —OR$^1$, —R$^1$CONH—, —O—CO—R$^1$ halogen or a substituted or unsubstituted heterocyclic radical, with the proviso that at least one of the radicals X, Y represents —N=N—R, in which R represents an aryl or a heterocyclic radical and
R$^1$, R$^2$ represent alkyl, cycloalkyl, aryl or aralkyl, which may be interrupted by O and/or S, and in which furthermore the radicals mentioned for R, R$^1$ and R$^2$ can be substituted, the dyestuff which, in the form of its free acid, conforms to the formula I where

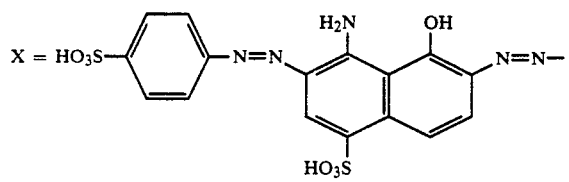

and

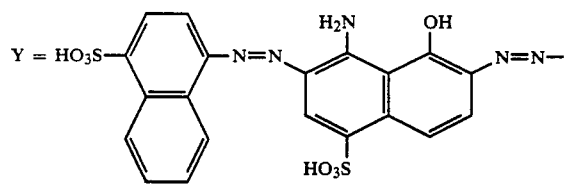

being excepted and the azo dyestuffs containing a maximum of eight azo bridges.

In particular, R signifies an aromatic radical from the benzene or naphthalene series, preferably of the formulae

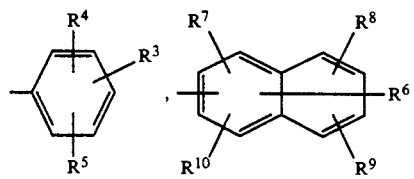

in which $R^3$ signifies H, OH, —OR$^1$, —NH$_2$, —NHR$^1$, —NR$^1$R$^2$, —NH—COR$^1$, —O—COR$^1$, —N=N—R$^{11}$, a heterocyclic radical, $R^4$, $R^5$, $R^7$, $R^8$, $R^9$, $R^{10}$ signify H, halogen, —OH, —OR$^1$, —NH$_2$, —NHR$^1$, —NR$^1$R$^2$, R$^1$, —SO$_3$H, —SO$_2$—NH$_2$, —SO$_2$—NHR$^1$, —SO$_2$—NR$^1$R$^2$, —O—CO—R$^1$, —NH—CO—R$^1$, $R^6$ signifies H, —N=N—R$^{11}$, a substituted or unsubstituted heterocyclic radical and $R^{11}$ signifies a substituted or unsubstituted aryl radical, preferably a substituted or unsubstituted phenyl or naphthyl radical or a substituted or unsubstituted heterocyclic radical or a nitrogen-containing heterocyclic radical.

Preferred radicals R and R$^{11}$ of the benzene series are as follows:

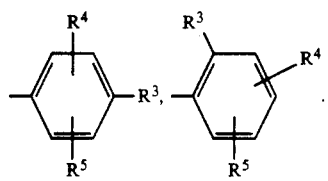

In particular, suitable radicals are those which are derived from phenol and its substitution products, if appropriate subsequently alkylated or acylated, and from aniline and its substitution product also, if appropriate, subsequently alkylated or acylated. Examples are:

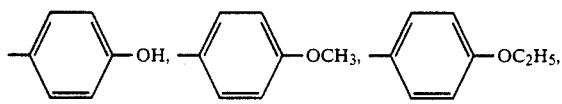

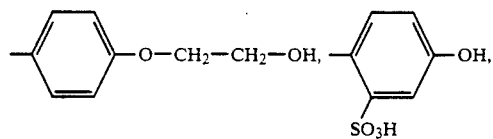

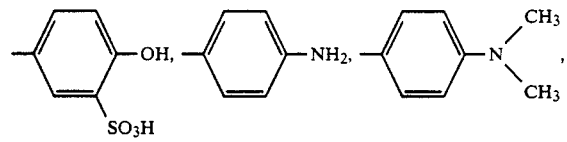

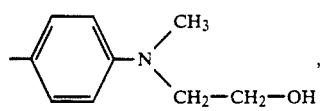

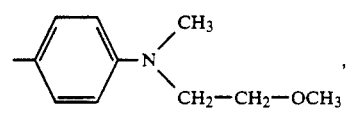

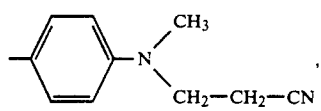

-continued

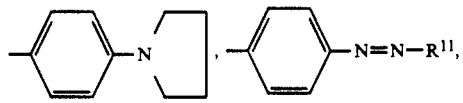

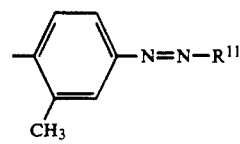

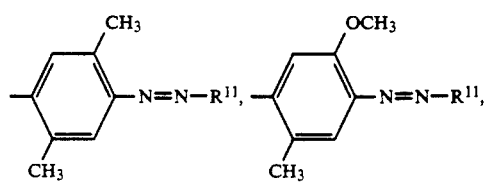

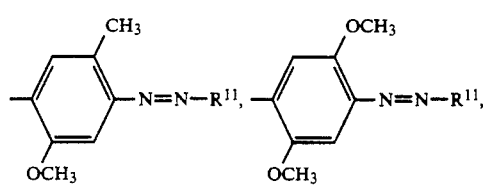

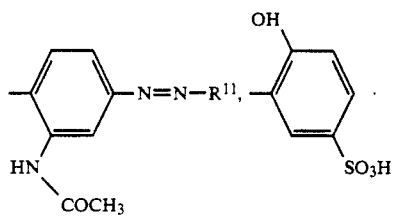

Preferred radicals R and R$^{11}$ of the naphthalene series are listed below:

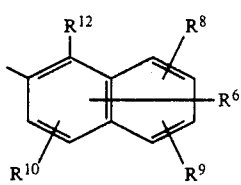

$R^{12}$ = —OH, —NH$_2$

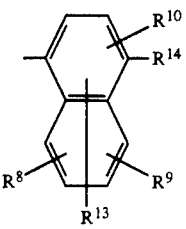

$R^{13}$ is H, if $R^{14}$ = —N=N—R$^{11}$ or H, and is —N=N—R$^{11}$, if $R^{14}$ = —OH, —NH$_2$, $R^{14}$ is —OH, —NH$_2$, —N=N—R$^{11}$,

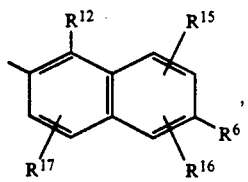

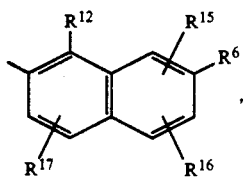

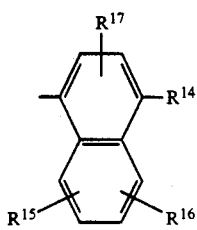

$R^{15}$, $R^{16}$ are H, —OH, —OR$^1$, —O—COR$^1$, —NH$_2$, —NH—R$^1$, —NHR$^1$R$^2$, —NH—CO—R$^1$, —SO$_3$H, $R^{17}$ is H, —SO$_3$H.

In particular, the following radicals R and R$^{11}$ of the naphthalene series are preferred:

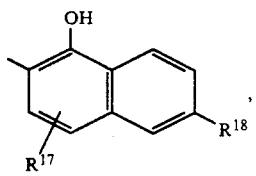

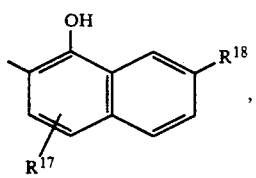

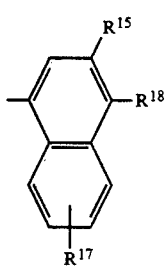

$R^{18}$ is H, Oh, NH$_2$, —NH—CO—R$^1$, —NH—R$^1$, —N=N—R$^{11}$, —SO$_3$H,

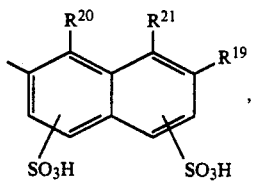

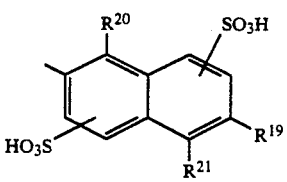

$R^{19}$ is H, —N=N—R$^{11}$,
$R^{20}$, $R^{21}$ are OH, NH$_2$, —O—CO—R$^1$, —NH—CO—R$^1$,

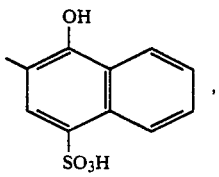

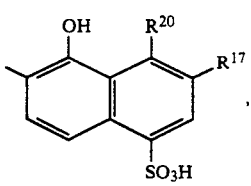

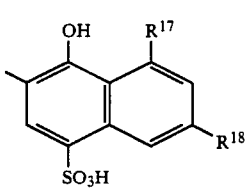

Preferably, R and R$^{11}$ are derived from the (substituted) I acid:

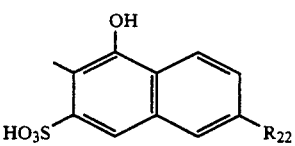

$R_{22}$ is —NH—R$^1$, —NH—CO—R$^1$, —N=N—R$^{11}$

Preferred radicals X, Y, R$^3$ and R$^6$ of the heterocyclic series have the formula

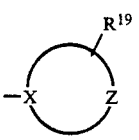

in which
  X is a C or an N atom, where the free valence of carbon has been saturated by a double bond, and Z represents the remaining members of a preferably 5- or 6-membered monocylic or bicyclic or tricyclic ring
which can contain 1 to 3 heteroatoms from the series consisting of N, O, S and is substituted or unsubstituted.

In particular, they are derived from the following heterocyclic systems: triazole, pyrazole, benzotriazole, naphthotriazole, oxazole, imidazole, thiazole, oxadiazole.

Preferred radicals R and Ru of the heterocyclic series have the formula

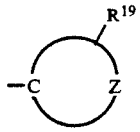

in which
Z represents the remaining members of a preferably 5- or 6-membered monocyclic or bicyclic or tricyclic ring,
which can contain 1 to 3 heteroatoms from the series consisting of N, O, S and is substituted or unsubstituted, the free valence of carbon being saturated by a double bond.

In particular, R and $R^{11}$ are derived from the following heterocyclic systems (coupling components):
thiophene, triazole, pyrazole, pyridine, benzotriazole, pyridone, naphthotriazole.

In addition, $R^{11}$ is derived from the following heterocyclic systems (diazo components):
thiadiazole, thiazole, benzothiazole.

Suitable heterocyclic radicals R and $R^{11}$ are in particular a substituted 5-amino- or 5-hydroxypyrazole radical.

Further preferred radicals R and $R^{11}$ are those of the formula:

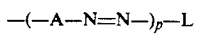

in which
A is a substituted or unsubstiuted phenylene or naphthalene radical,
L is a substituted or unsubstituted phenyl or naphthyl radical and
p is 1, 2, 3.
In particular, A represents

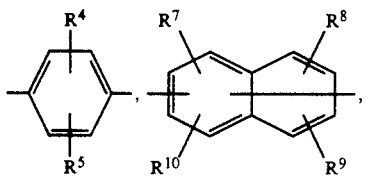

and L represents

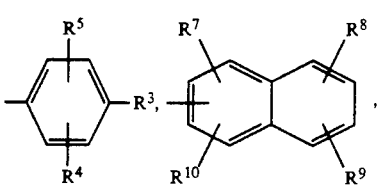

Examples of radicals R and $R^{11}$ are:

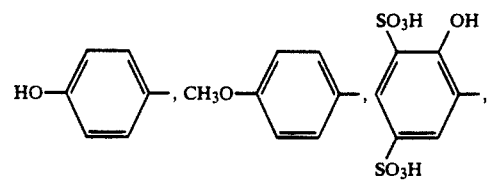

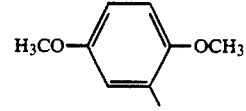

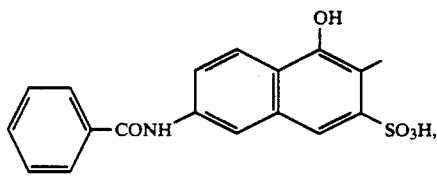

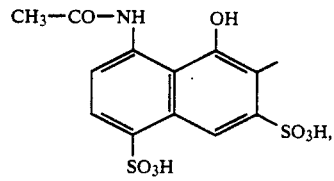

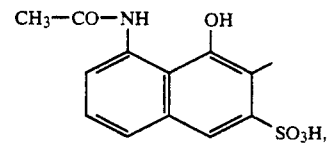

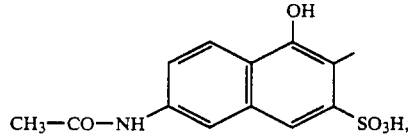

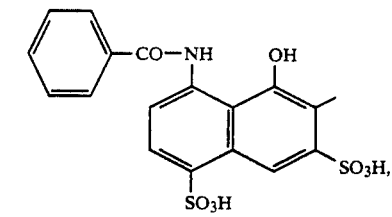

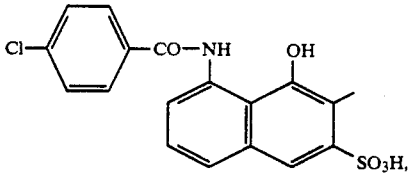

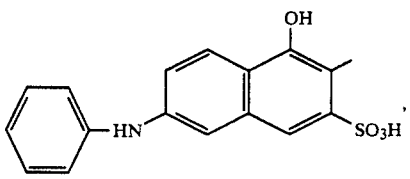

-continued
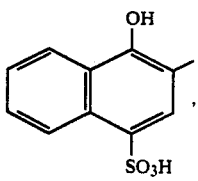
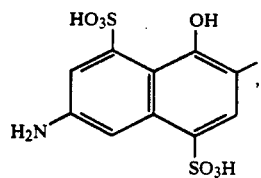
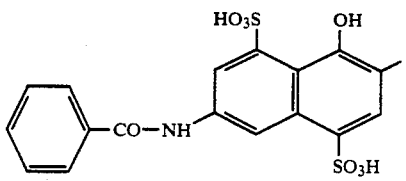
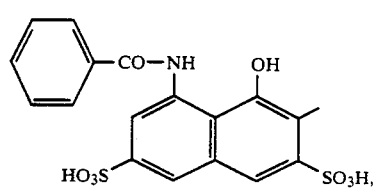
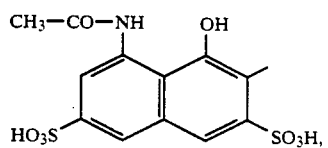
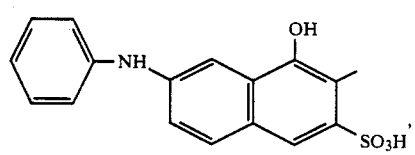
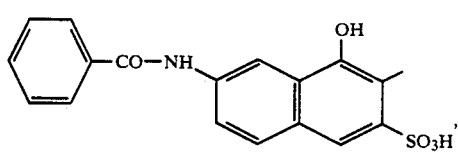
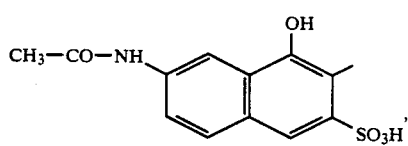
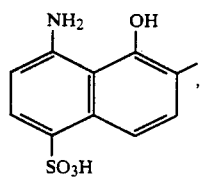
-continued
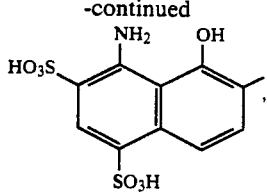
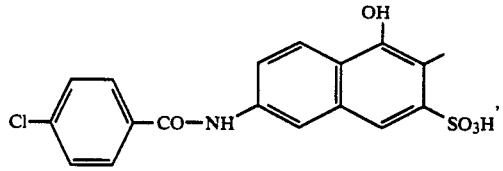
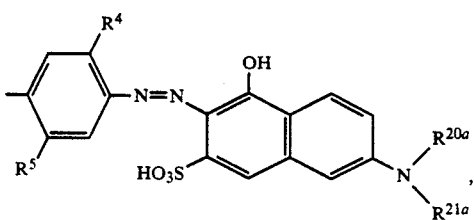
$R^{20a}$, $R^{21a}$ are H, $C_1$–$C_4$-alkyl (methyl), $C_1$–$C_4$-alkyl-carbonyl, in which alkyl can be substituted by —OH, OAlk, CN or are (2-hydroxyethyl, 2-cyanoethyl), phenyl, benzyl, benzoyl which can be substituted by —$NO_2$, —OH, $C_1$–$C_4$-alkyl (methyl), halogen, —$SO_3H$, —COOH,
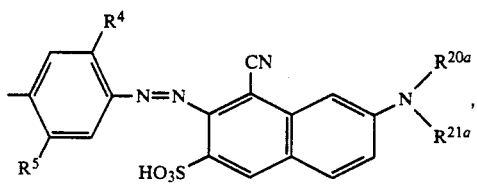
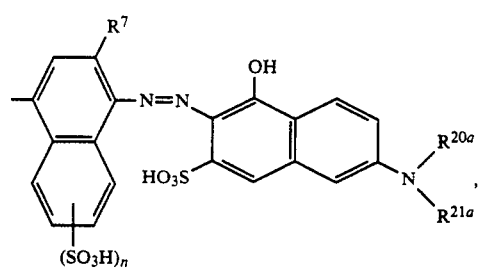
n is 0, 1 or 2
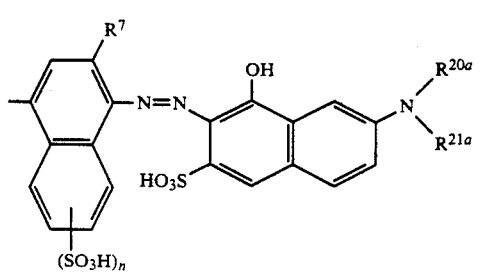

-continued

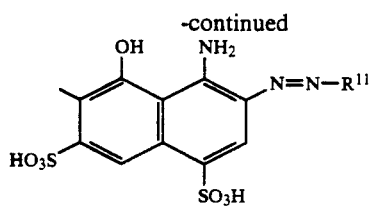

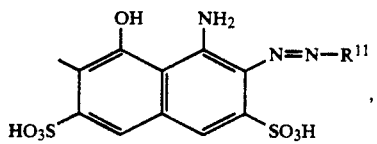

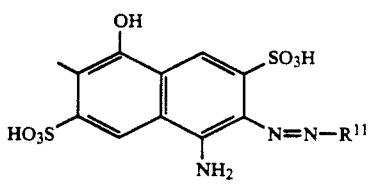

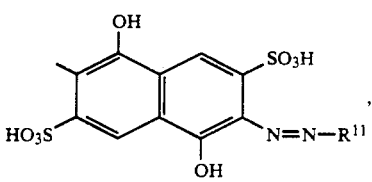

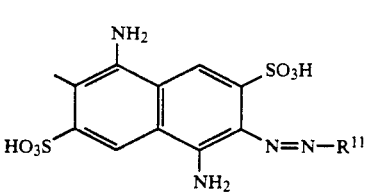

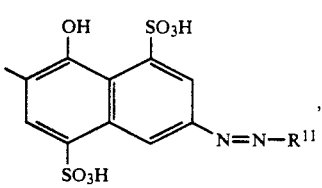

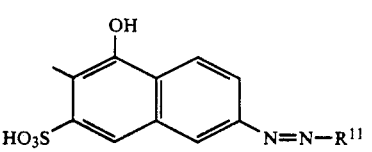

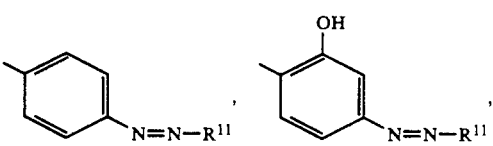

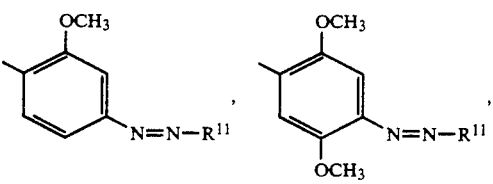

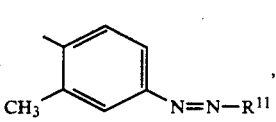

-continued

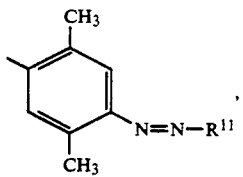

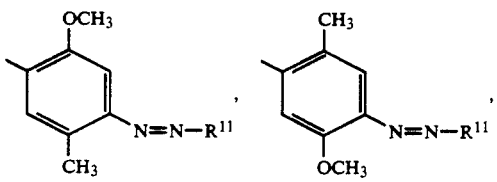

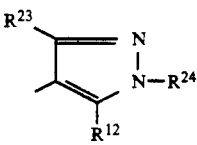

$R^{23}$ is H, $C_1$-$C_4$-alkyl (methyl), —COOH,
$R^{24}$ is a substituted or unsubstituted aryl radical, preferably

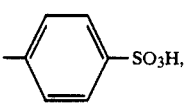

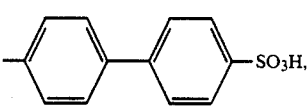

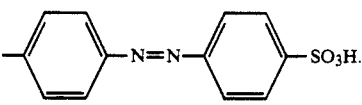

The radical R preferably contains 0, 1, 2 or 3 azo groups. Preferred are compounds of the formula I in which X=Y=—N=N—R. Halogen (X, Y) preferably represents F, Cl, Br, I. Heterocyclic radicals (X, Y) are preferably derived from a 5- or 6-membered heterocycle which contains 1 to 3 heteroatoms from the series consisting of N, O, S, for example triazole, pyrazole, oxazole, imidazole, thiazole, oxdiazole, thiadiazole, benzothiazole. Alkyl ($R^1$, $R^2$) preferably represents $C_1$-$C_6$-alkyl (methyl, ethyl), cycloalkyl ($R^1$, $R^2$) preferably represents $C_3$-$C_7$-cycloalkyl (cyclopentyl, cyclohexyl). Aryl ($R^1$, $R^2$) preferably represents phenyl and naphthyl.

Aralkyl ($R^1$, $R^2$) preferably represents phenyl-$C_1$-$C_4$-alkyl (benzyl, phenethyl).

Suitable substituents for the alkyl and cycloalkyl radicals ($R^1$, $R^2$) are, for example, halogen (Cl, Br, F), —OH, —CN, $C_1$-$C_4$-alkoxy and the like.

Suitable substituents for the aryl and aralkyl radicals ($R^1$, $R^2$) are, for example, halogen (Cl, Br, F), —OH, $C_1$-$C_4$-alkoxy (methoxy), $C_1$-$C_4$-alkyl (methyl), $CF_3$, $NO_2$, CN.

Compounds I can be prepared in analogy to processes known from the literature. Compounds II to V, the preparation of which is illustrated below, can serve as starting material.

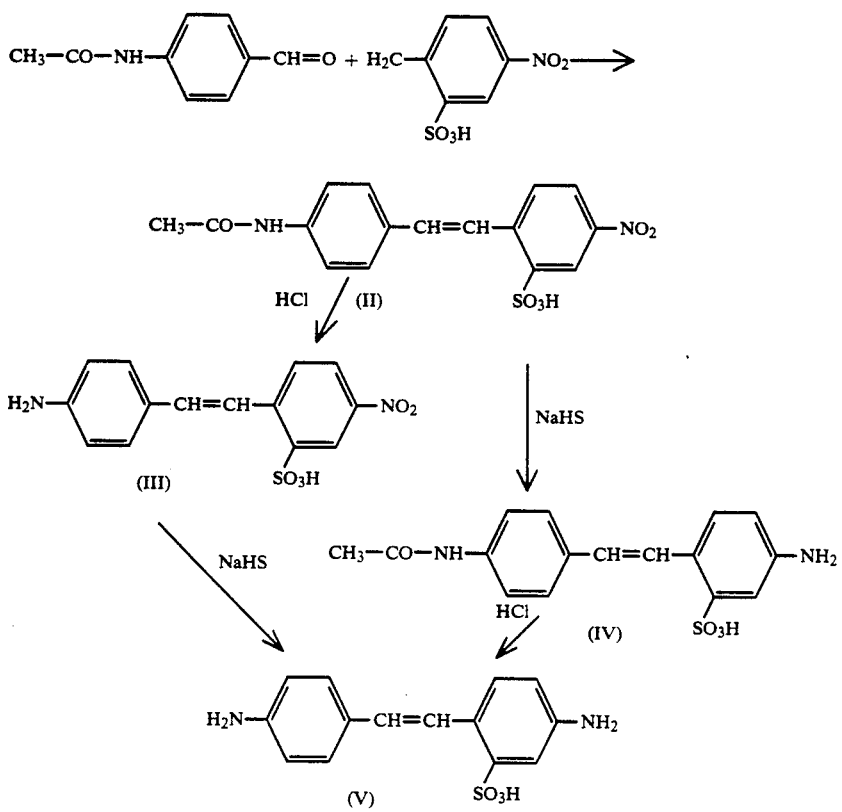

Further possible syntheses of these and similar suitable intermediates for the synthesis of dyestuff can be found in DOS (German Patent Specification) 3,805,513; see in particular Example 2 and Example 2ter.

The synthesis of the dyestuff from these compounds is carried out in the usual manner by diazotization and coupling onto suitable coupling components.

Compound III is diazotized, and the product is coupled onto components such as phenols, anilines, (aminohydroquinone dimethyl ether), benzoyl I acid, acetyl gamma-acid, N-(4-sulphophenyl)-5-pyrazolone etc. The phenolic OH groups of the products from the phenol couplings can then be sealed by alkylation.

The free amino groups of the product from the aniline couplings can again be diazotized, and the product again be coupled onto phenols, anilines, benzoyl I acid, acetyl gamma-acid etc. Finally, the nitro group on the dyestuff can be reduced, and the free amino group can be coupled onto the coupling components mentioned, which makes it possible to prepare "unsymmetrical" compounds.

The free amino groups from the aniline coupling or the reduction of the nitro groups can also be acylated, for example with benzoyl chloride.

Compound (IV) is diazotized and coupled onto components as phenols, anilines (aminohydroquinone dimethyl ether), benzoyl I acid, acetyl gamma-acid, acetyl H acid, N-(4'-sulpho-diphenyl)-5-pyrazolone, etc. The phenolic OH groups of the products from the phenol couplings can then be sealed by alkylation. The free amino groups of the products from the aniline couplings can again be diazotized, and the product again be coupled onto phenols, anilines, benzoyl I acid, acetyl gamma-acid etc. Finally, the acetylamino group on the dyestuff can be cleaved, and the free amino group can be coupled onto the coupling components mentioned; thus, it is possible also to prepare the derivatives which, with respect to the position of the sulpho groups, are isomers to those prepared from (III). The free amino groups from the aniline coupling or the cleavage of the acetylamino group can also be acylated, for example with benzoyl chloride.

Compound (V) can be tetrazotized, and the product can be coupled onto the abovementioned coupling components. The phenolic OH groups of the products from the phenol couplings can then be sealed by alkylation. The free amino groups of the products from the aniline couplings can again be diazotized, and the product again coupled onto phenols, anilines, benzoyl I acid, acetyl gamma-acid etc., and they can also be acylated, for example with benzoyl chloride.

The amino groups of the monoamino compounds III and IV can be converted to the corresponding halogen, CN, OH compounds etc. according to Sandmeyer or, for example, to various derivatives (triazole, pyrazole etc.). After reduction of the nitro group or hydrolysis of the acetylamino group, the monoamino compounds obtained can be coupled to give azo dyestuffs.

Diamino compound V can be condensed with azo dyestuffs which contain a nitro group, preferably in a 4-position with respect to an azo group, to form azoxy bridges, which can subsequently be reduced to azo bridges by treatment, for example, with glucose. Likewise, 4,4'-dinitrostilbene-2-sulphonic acid (Preparation see DOS (German Patent Specification) 3,805,513, Example 2) can be condensed with azo dyestuffs which contains an amino group, preferably in the 4-position with respect to an azo group, to form azoxy bridges, which can likewise be reduced to azo bridges.

In a further aspect, the invention relates to light-polarizing films (sheets) which contain an organic polymer and one or more compounds of formula I.

The organic polymer is preferably an oriented polymer which forms transparent films and is compatible with dyestuffs which contains acidic groups. Examples of such a polymer are: liquid-crystalline polymers, for example based on polyesters, polyamides, cellulose acetate, vinyl alcohol homopolymers and copolymers and vinyl acetate homopolymers and copolymers, where the comonomers present can be, for example, ethylene, propylene, crotonic acid, (meth)acrylic acid, maleic acid. Polyvinyl alcohols which have been prepared by complete or partial hydrolysis of polyvinyl acetate, in particular those types which have a viscosity of $>4$ mPa·sec$^2$, preferably 20 to 70 mPa·sec$^2$, at 20° C. in 4% strength aqueous solution and a hydrolysis degree of $>80$ mole %, preferably 85 to 100 mole %, are preferably used. The films preferably have a thickness of 10 to 150μ. Preferably, those sheets are used which have stretched at room temperature or elevated temperature, preferably at 80° to 160° C., by 200 to 1000%.

The films preferably have a thickness of 10 to 150μ. The films preferably contain 0.01 to 10% by weight, particularly preferred 0.5 to 6% by weight, relative to the weight of the film, of the dyestuff or the dyestuff mixture. The films are coloured in the usual manner, for example by colouring the polymer which is dissolved (in water). It is recommended to free the dyestuffs or dyestuff salts before use of foreign salts, for example by recrystallization, extraction and/or dialysis.

The dichroism of the system can be considerably enhanced by addition of polyhydric alcohols, such as glycol, glycerol, diglycol, trimetholethane, trimethylolpropane, pentaerythritol, sorbitol, their ethers, such as glycol monomethyl ether, glycol monoethyl ether, glycol dimethyl ether, diglycol diethyl ether, hydroxy amines, such as propanolamine or amides, such as DMF, N-methylpyrrolidone, pyrrolidone, ε-caprolactam, to the casting solution. The additives can be used alone or, more advantageously, in mixtures, in which lower monohydric alcohols, for example methanol, ethanol, propanol, i-propanol, can also be present as components of the mixture. The additives are added to the casting solution in amounts of 1–50% by weight, relative to the casting solution.

The film is produced in a manner known per se from the solution by casting.

If desired, the dyestuff-containing films can also be subjected to an aftertreatment, for example with aqueous boric acid solution, in order to improve the light permeability or the polarization coefficient. The conditions under which this aftertreatment is carried out can vary, depending on the film material and dyestuff. Preferably, a 1–15% strength by weight, particularly preferably a 5–10% strength by weight, boric acid solution is used at 30°–80° C., particularly preferably at 50°–80° C.

Preferably, surfactants and, if desired, inorganic salts are added to the boric acid solution. The surfactants can be nonionic, cationic or anionic; preferably, they are nonionic. Examples of nonionic surfactants are: addition products of ethylene oxide with higher alcohols or addition products of ethylene oxide with nonylphenol. Preferably, 0.005–0.5% by weight, particularly preferably 0.02–0.2% by weight, of surfactant is used, relative to the water.

Suitable inorganic salts are preferably sodium sulphate and furthermore potassium sulphate, sodium chloride, potassium chloride, sodium nitrate, potassium nitrate. Relative to the water, preferably 0.1–5% by weight, particularly preferably 0.3–3% by weight, of inorganic salts are used. If desired, this can be followed by a fixation treatment with an aqueous solution of a high-molecular weight cationic compound.

The light-polarizing films or sheets can be compounded or laminated with other materials in a manner known per se. Examples of suitable protective coatings are sheets made of a tetrafluoroethylene/hexafluoroethylene copolymer or another fluorohydrocarbon resin, a polyester, polyolefine or polyamide resin, a polycarbonate or cellulose ester, preferably cellulose triacetate, cellulose tripropionate, cellulose tributyrate.

Besides being used in light-polarizing films, the dyestuffs of the formula (I) can be used alone or in mixtures for rendering ordered structures visible in the analysis of polymers and in biological material.

EXAMPLE 1 a) Synthesis of the dyestuff

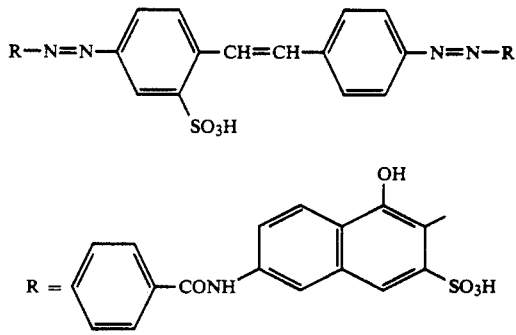

29 g (0.1 M) of 4,4'-diaminostilbene-2-sulphonic acid (prepared according to DOS (German Patent Specification) 3,805,513, Example 3) are suspended in 1 l of water. 83 ml of concentrated hydrochloric acid are added and 51 ml (0.22 M) of sodium nitrite solution (as an approximately 30% strength solution) are added dropwise slowly at room temperature. The suspension is stirred overnight. After this time, it should be possible to detect a nitrite excess which is destroyed by the addition of sulphamic acid solution. This tetrazonium salt solution is slowly added dropwise at room temperature, while controlling the pH, to a solution of 69 g (0.2 M) of 1-hydroxy-6-benzoylaminonaphthalene-3-sulphonic acid in 0.5 l of water, the pH being maintained between 6.5 and 7 by dropwise addition of 10 per cent strength sodium hydroxide solution. After stirring overnight, the precipitated dyestuff is filtered off with suction and washed several times with small portions of water. The dyestuff is then dissolved in water and subjected to dialysis, to separate off salts; the dyestuff solution obtained is then evaporated, and the residue is dried. Yield: 95 g.

b) Manufacture of the sheet 9.9 g of ®MOWIOL 28–99 (hydrolyzed polyvinyl acetate; degree of hydrolysis 99.4±0.4 mole %; viscosity of the 4% strength of aqueous solution at 20° C.:28±2.0 mPa·sec$^2$; from Hoechst AG) and 0.1 g of the dye of Example 1a are dissolved in 190 ml of water by heating the mixture at 90° C. for 2 hours with stirring. 5 g of methanol and 2.5 g of glycerol are added to 92.5 g of the strength, relative to the polymer, dyestuff solution obtained. By means of a knife, 500μ thick layers are applied from this solution to a clean glassplate, and the layers thus obtained are dried in air at room temperature on a support in an exactly horizontal position. The resulting dry sheets are peeled off from the glassplate; they have a violet colour and are about 40–50μ thick.

c) Stretching of the sheets

To produce dichroic properties, the sheets are stretched. To this end, they are heated in a drying cabinet at a constant temperature of 130° C. for 15 minutes and then stretched at a speed of about 10 cm/min to about 700% of their original length. The stretched sheets have a dichroic ratio of about 43 at the absorption maximum (570 nm), measured with polarized light; losses due to reflection are not taken into account in the measurement.

d) Sheet manufacture on the casting machine 0.2 g of the dyestuff of Example 1a is dissolved in 100 g of hot water. 10 g of glycerol are added, and 19.8 g of ®MOWIOL 28-99 are stirred into the cooled solution. After stirring at room temperature for 1 hour, the mixture is heated to 90° C., and stirring is continued at this temperature until, after about 3 hours, a homogenous solution has been formed. At 50° C., 5 g of methanol are then stirred in. The warm solution is filtered through a filter press, while injecting air, and is then degassed by evacuation. The casting solution is pourable and stable at 30° C.

To produce a sheet, the casting solution is applied continuously by means of 250μ knife to the casting wheel (wheel diameter 25 cm, rotating speed about 7.5 min per revolution) which has been preheated to about 50° C. The layer is dried by passing heated air over it, and the solidified sheet is continuously peeled off the wheel and additionally dried. The sheet obtained is about 40μ thick. It is stretched as described above in c), leading to similar results.

e) Exactly analogously as in Example 1a, analogous dyestuffs are obtained by using the coupling components mentioned (the line—denotes in each case the coupling site), which are incorporated into sheets according to 1B. Stretching according to 1c gives dichroic sheets.

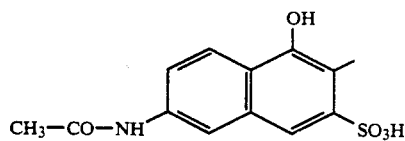

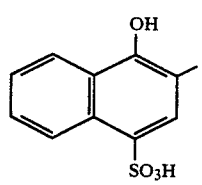

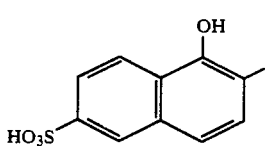

-continued

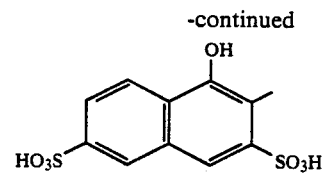

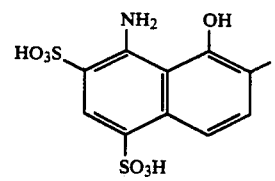

Further dyestuffs are prepared analogously to Example 1a from the following coupling components:

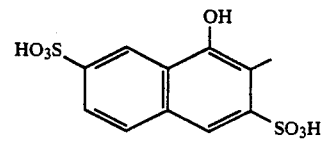

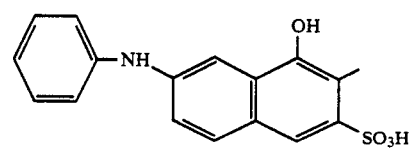

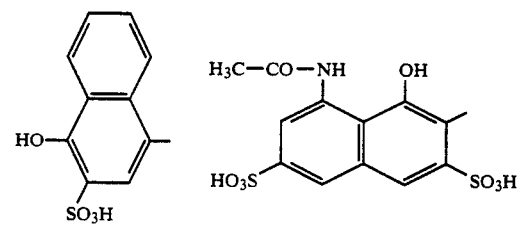

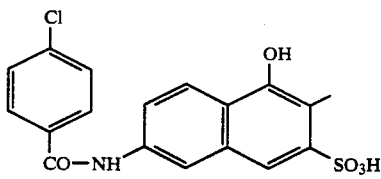

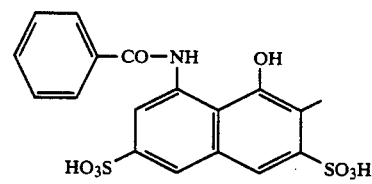

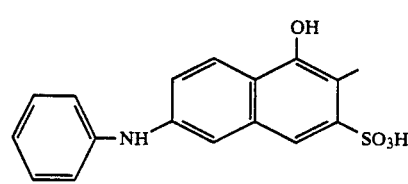

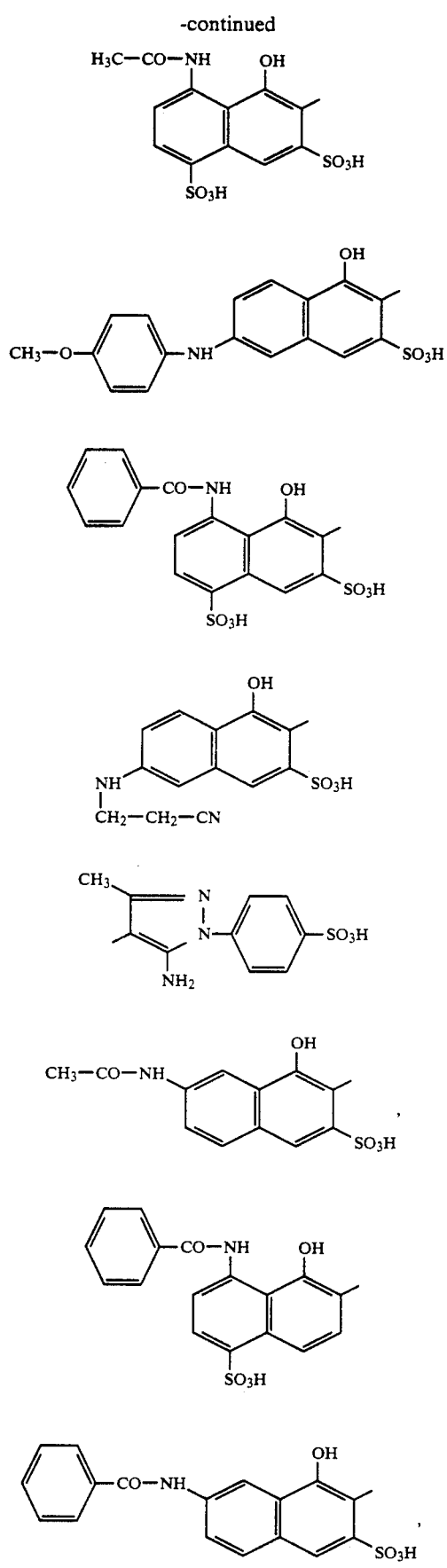

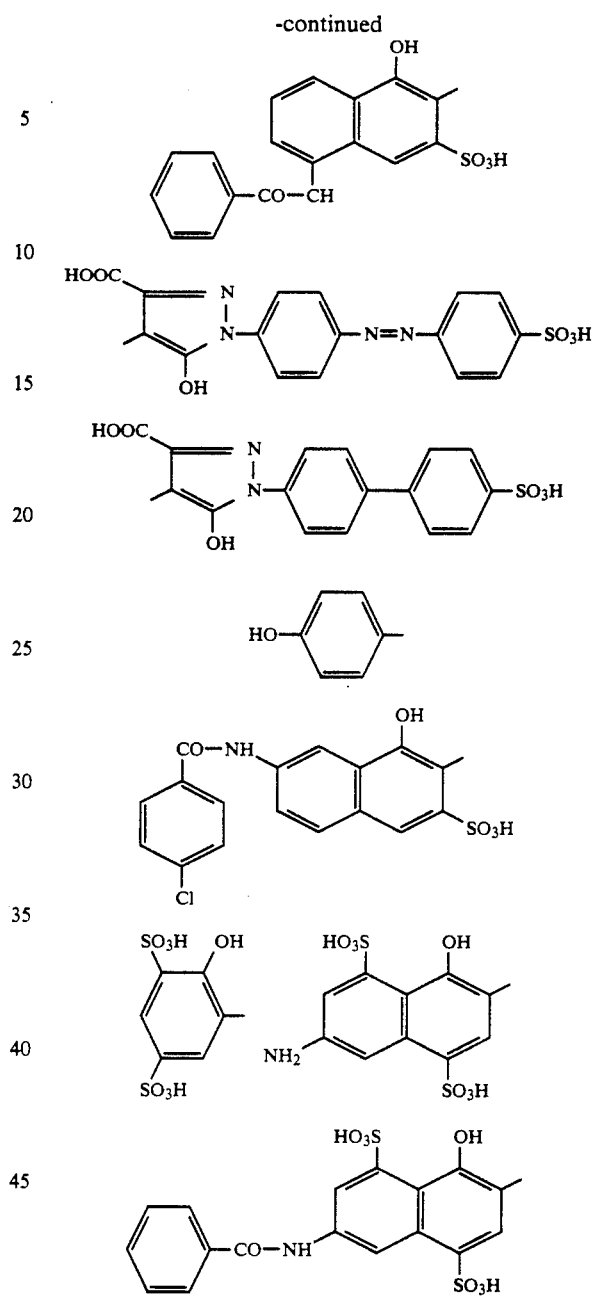

The products obtained from the coupling onto phenols can be "sealed" by subsequent alkylation, for example methylation using dimethyl sulphate.

EXAMPLE 2 a) 17.3 g (0,1 M) of 4-aminobenzene sulphonic acid are dissolved into 200 ml of water in combination with about 7 ml of sodium hydroxide solution (45% strength) and 28 ml of concentrated hydrochloric acid are then added all at once. The freshly precipitated suspension is diazotized at 5°-10° C. with 7 g of sodium nitrite in 15 ml of water. After 15 minutes, the product is filtered off with suction and washed on the filter with icewater. The moist product is immediately stirred into 100 ml of water (caution: the dry product is explosive). To the suspension of diazonium salt thus obtained is added dropwise, with vigorous stirring, a cold solution of 34.1 g (0.1 M) of 8-amino-1-hydroxy-naphthalene-3,6-disulphonic acid monosodium salt and 5.5 g of sodium carbonate in 100 ml of water over a period of 45 minutes. The mixture is stirred for 12 hours while warming to room temperature, the product is filtered off with suction and washed neutral. This gives a dyestuff paste of the formula:

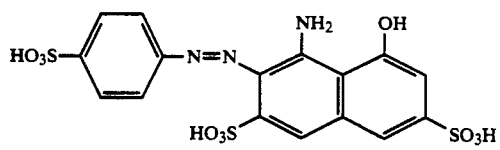

b) The dyestuff paste from a) is dissolved together with 40 g of sodium carbonate in about 500 ml of water, if necessary with heating, and then cooled to below 10° C. The tetrazonium salt solution from 14.5 g (0.05 M) of 4,4'-diaminostilbene-2-sulphonic acid prepared according to Example 1a is added dropwise to the suspension obtained over a period of 30 minutes, while maintaining the pH at 6.5 to 7 by metering in 10 per cent strength of sodium hydroxide solution. The mixture is stirred overnight, the dyestuff is filtered off with suction, washed neutral with water and then dissolved in water and dialyzed to separate off salts. The dyestuff solution is evaporated and the residue is dried. The dyestuff obtained has the structure:

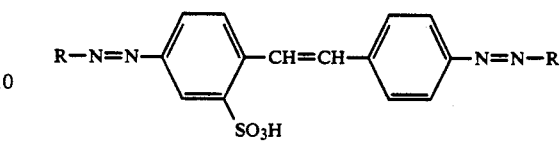

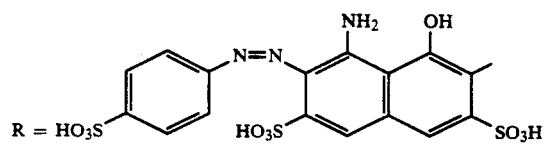

c) The following coupling components which can be prepared analogously to 2a) can also be used:

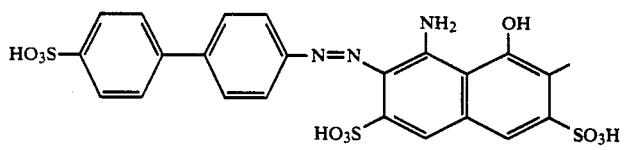

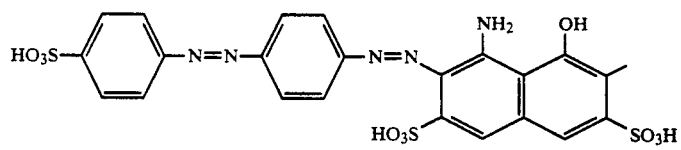

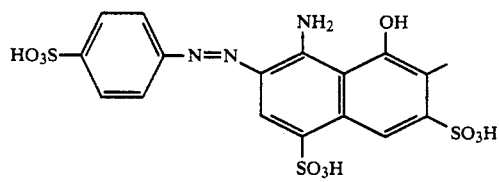

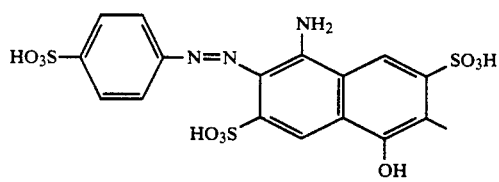

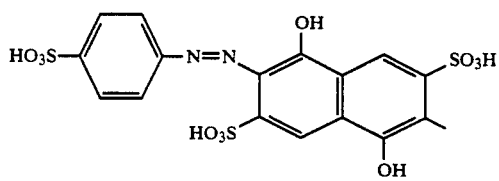

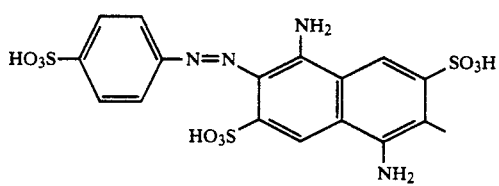

d) Exactly analogously, the dyestuff of the structure:

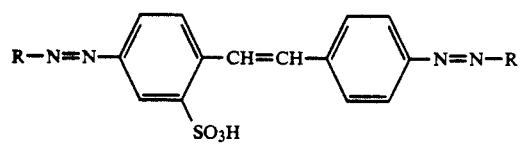

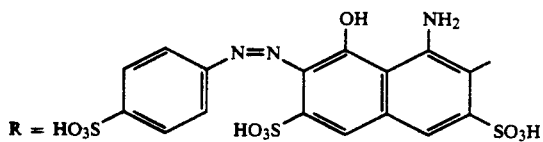

is obtained by coupling the tetrazonium salt solution of Example 1a first at a pH of 4.5–5.5 onto 1-hydroxy-8-aminonaphthalene-3,6-disulphonic acid and then coupling the diazonium compound from 4-aminobenzene sulphonic acid prepared according to Example 2a twice onto the product at a pH of 7–7.5.

The other components mentioned in c) can also be reacted in reverse order to give analogous dyestuffs.

EXAMPLE 3 a) At a maximum temperature of 10° C., a solution of 30.6 g (0.2 M) of 2,5-dimethoxyaniline in 500 ml of water (to which concentrated hydrochloric acid is added until a clear solution is formed) is added dropwise to the tetrazonium salt solution prepared according to Example 1a, with stirring, while maintaining a pH of 3 to 4.5 by simultaneous metering in of sodium hydroxide solution After stirring overnight and warming to room temperature, the coupling reaction is completed. The product is filtered off with suction and carefully washed neutral with water. The dyestuff obtained after drying weighs 57.2 g and has the formula:

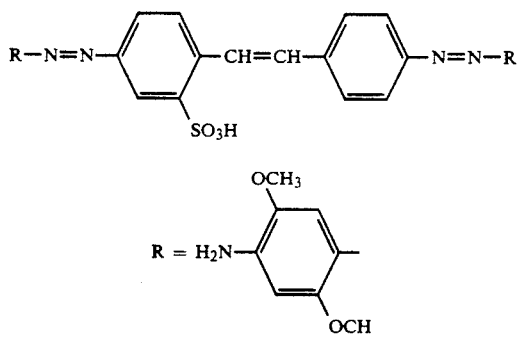

Instead of 2,5-dimethoxyaniline, it is also possible to use 2-methoxy-5-methylaniline, 2,5-dimethylaniline, 3-methylaniline, 3-acetylaminoaniline, 1-naphthylamine, 1-amino-2-ethoxy-naphthalene-6-sulphonic acid or anilinomethane sulphonic acid etc.

b) The intermediate product obtained in a) is tetrazotized in aqueous hydrochloric acid with sodium nitrite while letting it stand overnight at room temperature, and the tetrazonium salt solution obtained, after destruction of the nitrite excess, is coupled onto 1-hydroxy-6-benzoylamino-naphthalene-3-sulphonic acid at a pH of 6.5 to 8. The dyestuff obtained has the formula:

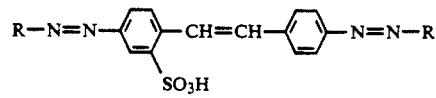

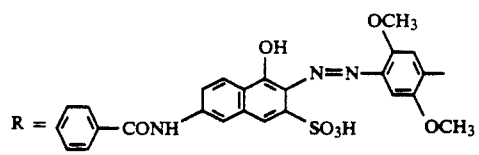

c) The other compounds mentioned in Example 1e and 2c can also be used as components of the final coupling reaction, and phenolic coupling components can subsequently be "sealed" by alkylation.

The dyestuffs obtained are incorporated according to Example 1b into a sheet, which is subsequently stretched.

EXAMPLE 4 a) 8.8 g (0.01 M) of the dyestuff from Example 1e formed by coupling of the tetrazonium salt from 1a onto 1-hydroxy-6-acetylaminonaphthalene-3-sulphonic acid are stirred in 200 ml of 2N sodium hydroxide solution at 80° C. until the acetyl groups have been completely cleaved off (monitoring of the reaction by thin-layer chromatography). The reaction mixture is neutralized, cooled, and the residue is filtered off with suction and washed neutral.

b) The dyestuff formed according to a) is dissolved in 100 ml of sodium hydroxide solution, 1.8 g of sodium nitrite are added to the solution, and the solution is then run into excess hydrochloric acid. After standing overnight at room temperature, the tetrazonium salt solution has been formed; excess nitrite is destroyed by means of sulphamic acid, 2 g of phenol dissolved in sodium hydroxide solution are then added dropwise, and the pH is brought to about 9 with sodium hydroxide solution. After stirring for 3 hours, the coupling reaction is completed. The product is filtered off with suction and washed neutral.

Instead of phenol, it is also possible to use the other coupling components listed in Tables 1e and 2c as end groups.

c) The dyestuff formed according b) is dissolved in 100 ml of 1N sodium hydroxide solution, and 4 g of dimethyl sulphate are added to the solution with stirring. After about 1 hour, the methylation is completed. The produced is filtered off with suction, washed neutral and dried. The dyestuff obtained has the formula:

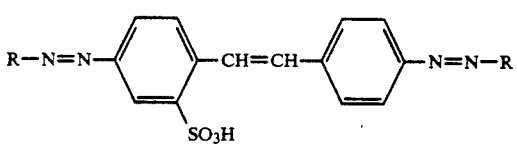

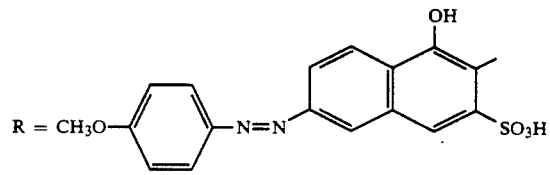

Instead of dimethyl sulphate, it is also possible to convert the phenolic groups with diethyl sulphate or benzyl bromide to the ethers.

EXAMPLE 5 a) The tetrazonium salt solution from Example 1a is added dropwise at about 10° C. to the solution of 68.4 g (0.2 M) of 1-hydroxy-8-acetylaminonaphthalene-3,6-disulphonic acid (monosodium salt) in 0.8 l of water, during which the pH is maintained at 6.5–7.5 by dropwise addition of 2N sodium hydroxide solution. The coupling reaction is then allowed to go to completion overnight, while heating to room temperature The product is filtered off with suction, washed neutral with water and dried. Yield: 60.5 g of a blue-violet soluble dyestuff.

b) 20 g of the dyestuff from a) are heated in 200 ml of 2N sodium hydroxide solution at about 80° C., until the acetyl groups have been cleaved off. The mixture is then acidified with hydrochloric acid, the product is filtered off with suction, washed neutral and dried. This gives 14 g of a dyestuff which, in the form of the free acid, has the following formula:

residue is taken up in 200 ml of hot water. After cooling, the product is filtered off with suction, washed with a small amount of water and dried: yield: 65 g (68%).

b) 4-nitro-4,-aminostilbene-2-sulphonic acid: 19.2 g (0.05 M) of sodium 4-nitro-4'-acetylaminostilbene-2-sulphonic acid and 200 g of half-concentrated hydrochloric acid are heated to reflux until the starting material has been completely converted according to the thin-layer chromatogram. After cooling, the product is filtered off with suction, washed neutral with small portions of water and dried. Yield: 14 g (88%).

c) 16 g (0.05 M) of 4-nitro-4'-aminostilbene-2-sulphonic acid (Example 6b) are suspended in 400 ml of water, and 40 ml of concentrated hydrochloric acid are added. Diazotization is carried out by dropwise addition of 12.8 ml of 30 percent strength of sodium nitrite solution (0.05 M+10%) at a maximum of 10° C., and stirring is then continued at about 20° C. overnight. The nitrite excess is then destroyed by addition of sulphamic acid.

The diazonium salt solution obtained is added dropwise to a solution of 17.2 g (0.05 M) of 1-hydroxy-6-benzoylaminonaphthalene-3-sulphonic acid in 160 ml of

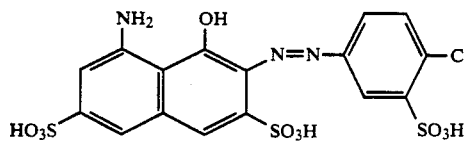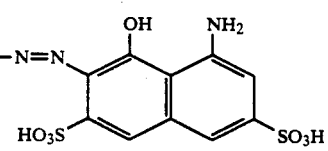

An analogous dyestuff is also obtained from 1-hydroxy-8-acetylaminonaphthalene-3,5-disulphonic acid, followed by cleavage.

The dyestuffs can be incorporated according to Example 1b into a sheet, which subsequently is stretched according to 1c.

water at about 20° C., during which the pH is kept in the range from 7 to 8 by dropwise addition of sodium hydroxide solution. After stirring overnight, the precipitated dyestuff is filtered off with suction, washed neutral with a small amount of water and dried. Yield: 27 g (80%).

This gives a dyestuff of the structure:

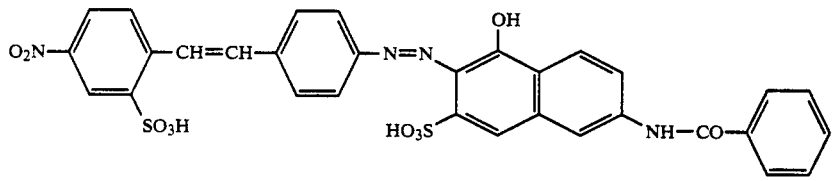

"Unsymmetrical" dyestuffs

A suitable intermediate for the preparation of "unsymmetrical" compounds is obtained analogously to the data in German Patent 1,065,838 (Geigy) by replacing benzaldehyde by 4-acetylaminobenzaldehyde. Likewise, the product described in DOS (German Patent Specification) 3,805,513 Example 2ter can be converted into a suitable intermediate by reduction of the nitro group.

EXAMPLE 6 a) 4-nitro-4,-acetylaminostilbene-2-sulphonic acid: 45.6 g (0.28 M) of 4-acetylaminobenzaldehyde and 59.8 g (0.25 M) of sodium 4-nitrotoluene-2-sulphonic acid are stirred into 90 ml of DMF, 9 ml of piperidine are added to the mixture, which is then heated at 140°–150° C. for 3 hours. The volatile components (piperidine and water) are then distilled off, 9 ml of piperidine are added to the residue, and the mixture is again heated at 140°–150° C. for 3 hours; this process is repeated once more. The DMF is then distilled off in vacuo, and the Exactly analogously as described above, an analogous dyestuff is obtained by replacing 1-hydroxy-6-benzoylaminonaphthalene-3-sulphonic acid by 1-hydroxy-6-anilinonaphthalene-3-sulphonic acid.

Further suitable coupling components are the ones mentioned in the Tables of Examples 1e and 2c.

d) If the nitro group of the 4-nitro-4'-acetylaminostilbene-2-sulphonic acid obtained according to a) is reduced in aqueous ethanol with sodium sulphide or analogously to the procedure in DOS (German Patent Specification) 3,805,513, Example 3, 4-amino-4'-acetylaminostilbene-2-sulphonic acid is obtained.

Exactly analogously, it is also possible to prepare 4-amino-4'-benzoylaminostilbene-2-sulphonic acid.

e) Diazotization of 4-amino-4'-acetylaminostilbene-2-sulphonic acid in accordance with the procedure of Example 6c, destruction of the nitrite excess with sulphamic acid, and coupling of the product onto 1-hydroxy-6-benzoylaminonaphthalene-3-sulphonic acid, while maintaining a pH of 7-8, gives a dyestuff of the structure:

ple 3, to the amino compound. Another possible reduction is that using iron powder in weakly acidic aqueous

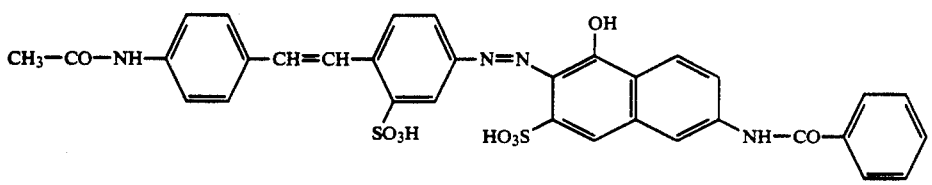

The corresponding dyestuff which has a benzoylamino group on the stilbene radical is obtained analogously.

The other compounds mentioned in Examples 1e and 2c can also be used as further coupling components.

EXAMPLE 7 a) At a maximum temperature of 10° C., a solution of 7.8 g (0.05 M) of 2,5-dimethoxyaniline in 125 ml of water (to which concentrated hydrochloric acid is added until a clear solution is formed) is added dropwise to the diazonium salt solution prepared according to Example 6c, with stirring, while maintaining a pH of 3 to 4.5 by metering in sodium hydroxide solution. After stirring overnight, during which the temperature is allowed to rise to room temperature, the coupling reaction is completed. The product is filtered off with suction and carefully washed neutral with water.

Instead of 2,5-dimethoxyaniline, it is also possible to use 2-methoxy-5-methylaniline, 2,5-dimethylaniline, 3-methylaniline, 3-acetylaminoaniline, 1-naphthylamine, 1-amino-2-ethoxynaphthalene-6-sulphonic acid or anilinomethane sulphonic acid etc.

b) The intermediate obtained in a) is diazotized in the form of a paste in aqueous hydrochloric acid with sodium nitrite, the diazotization being allowed to go to completion by standing overnight and warming to room temperature. Excess nitrite is destroyed by means of sulphamic acid.

The diazonium salt solution is coupled onto 1-hydroxy-6-anilinonaphthalene-3-sulphonic acid at pH 6.5 to 7.5. The dyestuff obtained has the formula medium according to Bechamp.

b) 16.1 g (0.025 M) of the dyestuff obtained in a) are suspended in 300 ml of water, 20 ml of concentrated hydrochloric acid are added and the mixture is diazotized by dropwise addition of 6.4 ml of 30 per cent strength sodium nitrite solution (0.025 M+10%) at a maximum of 10° C., and stirring is allowed to continue overnight at room temperature. The nitrite excess is then destroyed by addition of sulphamic acid.

The diazonium salt solution obtained is added dropwise to a solution of 8 g (0.025 M) of 1-amino-8-hydroxynaphthalene-2,4-disulphonic acid in 80 ml of water at about 20° C., while maintaining the pH at about 7. After stirring overnight, the precipitated dyestuff is filtered off with suction, washed with a small amount of water and dried. The dyestuff obtained has the structure:

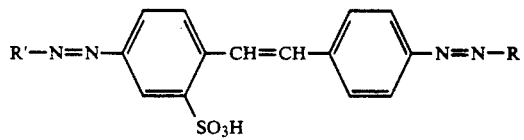

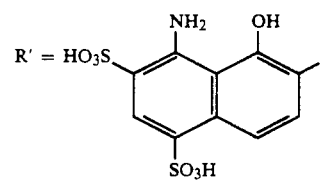

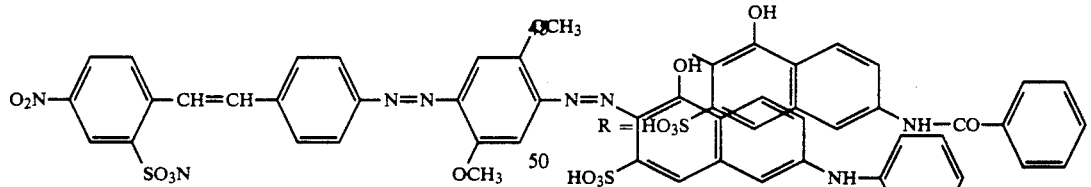

It is also possible to use the other compounds mentioned in Examples 1e and 2c as components of the end coupling.

The same dyestuffs are obtained by following the procedure in EP 160,113, except that the sodium 4-nitro-4'-aminostilbene-2,2'-disulphonate used there is replaced by 4-nitro-4'-aminostilbene-2-sulphonic acid and the middle component (2-methoxy-5-methylaniline) is chosen accordingly.

EXAMPLE 8 a) The dyestuff of Example 6c which still contains a nitro group is reduced in an ethanol/water mixture with sodium sulphide or analogously to the procedure in DOS (German Patent Specification) 3,805,513, Exam- It is also possible to use the other/compounds mentioned in Examples 1e and 2c as coupling components.

EXAMPLE 9 a) 5 g (about 0.05 M) of phenol are dissolved in 100 ml of water with the addition of sodium hydroxide solution, until a clear solution has been obtained, and the diazonium salt solution obtained in Example 6c is then added dropwise at about 10° C., during which a pH of about 9 is maintained by addition of sodium hydroxide solution. After stirring overnight, the mixture is neutralized, the precipitate filtered off with suction and washed.

The moist paste is reacted analogously to the procedure in Example 4c in aqueous alkaline solution with dimethyl sulphate, until complete methylation has taken place. This gives a dyestuff of the structure:

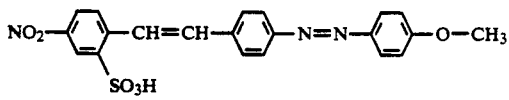

Analogously, it can also be reacted with other alkylating agents, for example diethyl sulphate or benzyl bromide.

b) The dyestuff obtained in a) is reduced with sodium sulphide in ethanol and water or with iron powder in weakly acidic medium to the amine. This amine is diazotized analogously to Example 6c with sodium nitrite, and excess nitrite is then destroyed by means of sulphamic acid.

The diazonium salt solution obtained is coupled in accordance with the further procedure in Example 6c onto 1-hydroxy-6-benzoylaminonaphthalene-3-sulphonic acid at a pH between 7 and 8, which gives a dyestuff of the formula below:

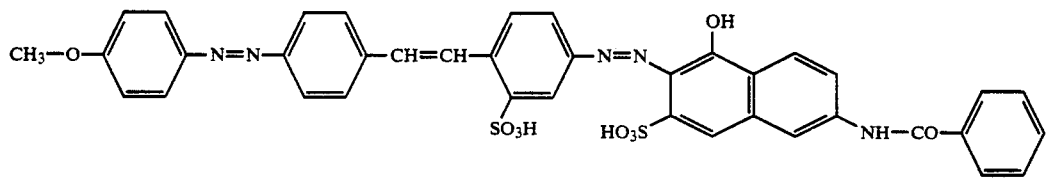

It is also possible to use the other compounds mentioned in Examples 1e and 2c as components of end coupling, in particular acetyl I acid, phenyl I acid, Chicago acid SS etc.

EXAMPLE 10 a) 4-amino-4'-nitrostilbene-2-sulphonic acid

The compound is prepared by cleavage of the 4-acetylamino compound analogously to Example 6b described in DOS (German Patent Specification) 3,805,513, Example 2ter.

b) Diazotization of the amino compound prepared in 10a, followed by coupling of the product onto 1-hydroxy-6-anilinonaphthalene-3-sulphonic acid analogously to the procedure in 6c gives the following dyestuff:

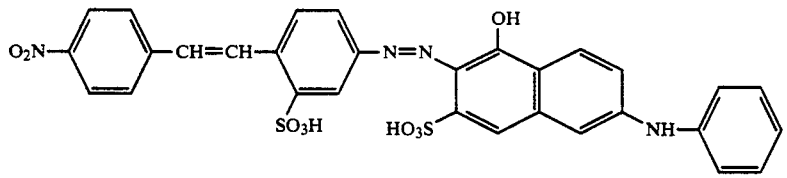

Further suitable coupling components are the ones mentioned in the Tables of Examples 1e and 2c.

The dyestuffs which are isomers with respect to the position of the sulpho group are obtained analogously by following the procedures of Examples 6 to 9; these dyestuffs have exactly analogous hues.

Condensation Dyestuffs

EXAMPLE 11

If the procedure of the examples in Houben-Weyl, Methoden der Organischen Chemie (Methods of organic chemistry), Vol. 10/3, Part 3, P. 343 are followed and 1,2-bis(4-nitro-2-sulphophenyl)ethylene is replaced by 4,4'-dinitrostilbene-2-sulphonic acid prepared according to DOS (German Patent Specification) 3,805,513, Example 2, mainly the yellow condensation product of the formula:

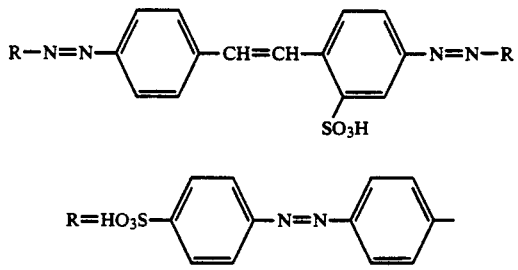

is obtained analogously to the description found there.

EXAMPLE 12

The reaction of 4-amino-4'-nitrostilbene-2,2'-disulphonic acid described in J. Org. Chem. USSR 16 (1980) 388 is applied to the monosulphonic acid:

a) 25 g (0.1 M) of copper (2) sulphate pentahydrate are dissolved with heating in 80 ml of water, and 15.5 g (0.15 M) of sodium bromide are added. A solution of 6.3 g (0.05 M) of anhydrous sodium sulphite in 20 ml of water are slowly added to the solution with stirring. After cooling, the precipitate is separated off by decanting, washed with water and then dissolved in 40 ml of concentrated hydrobromic acid.

24 g (0.075 M) of the amine of Example 6b are diazotized analogously to the procedure of Example 6c, except that hydrobromic acid is added instead of hydrochloric acid. The diazonium salt solution is then stirred into the previously prepared above Cu salt solution at 0° C. with stirring. The mixture is carefully heated, which leads to the formation of the SANDMEYER product with evolution of nitrogen. After the evolution of gas has stopped, the resulting bromine compound of the structure:

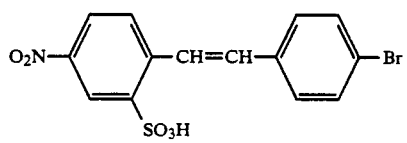

is precipitated by salting out, filtered off with suction, washed and dried.

Exactly analogously, it is also possible to prepare the corresponding chlorine compound or the cyanide instead of the bromine compound.

If the amine of Example 10a is used instead of the amine of Example 6b and hydrochloric acid is used instead of hydrobromic acid, the following compound is obtained analogously:

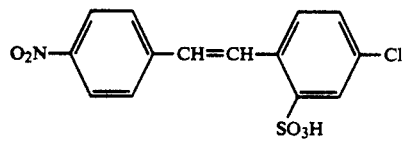

b) The compound of Example 12a is reduced analogously to the procedure in Example 9b to the amino compound. This compound is converted into the corresponding diazonium salt, for example as described in 6c, and then as also described in 6c, coupled onto 1-hydroxy-6-benzoylaminonaphthalene-3-sulphonic acid, while maintaining a pH of about 7–8. This gives the dyestuff of the structure:

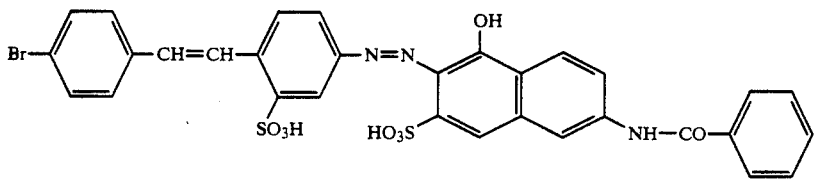

Further suitable coupling components are those mentioned in Tables 1e and 2c.

c) If the procedure of Example 7 is repeated and the diazonium salt solution prepared in 12b is used instead of that used in 7a, and the product is first coupled onto 3-methylaniline and then onto 1-hydroxy-6-anilinonaphthalene-3-sulphonic acid, a dyestuff of the structure:

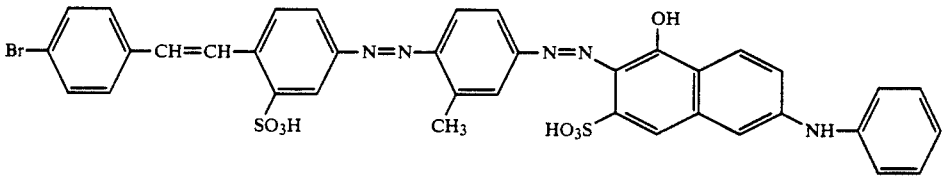

is obtained.

Further suitable coupling components are those mentioned in Tables 1e and 2c.

Instead of 3-methylaniline, it is also possible to use 2,5-dimethoxyaniline, 2-methoxy-5-methylaniline, 2,5-dimethylaniline, 3-acetylaminoaniline, 1-naphthylamine, 1-amino-2-ethoxynaphthalene-6-sulphonic acid or anilinomethanesulphonic acid etc.

d) If the corresponding chlorine or cyano compound is used in 12b and c) instead of the bromine compound from 12a, analogous dyestuffs are obtained.

EXAMPLE 13

Analogously to the procedures in Houben-Weyl, Methoden der Organischen Chemie (Methods of Organic Chemistry), Vol. 10/3, Part 3, p. 428, 429, the compound of the following formula is obtained by coupling of diazotized 4-amino-4'-nitrostilbene-2'-sulphonic acid, see Example 6b, onto 1-aminonaphthalene-4-sulphonic acid:

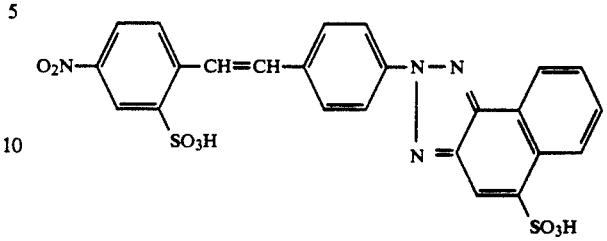

It is reduced analogously to the procedure of Example 12b to the amino compound.

The compound which is an isomer with respect to the position of the sulpho group is obtained analogously by coupling onto 2-aminonaphthalene-6-sulphonic acid, followed by reduction to the amino compound.

b) The amino compound prepared in a) is diazotized according to the procedure in Example 6c, and the product is coupled as described there onto 1-hydroxy-6-anilinonaphthalene-3-sulphonic acid. This gives a dyestuff of the structure:

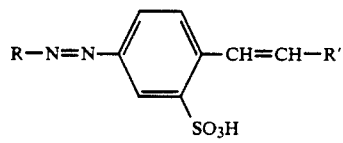

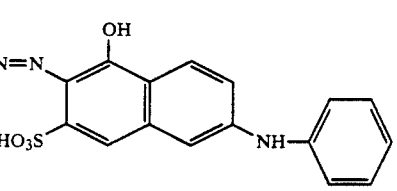

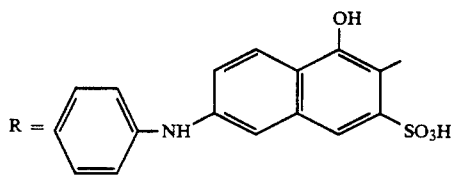

-continued

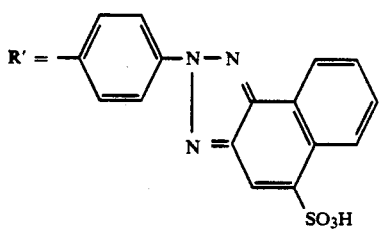

Analogously, the use of 2-aminonaphthalene-6-sulphonic acid give the isomeric dyestuff in which

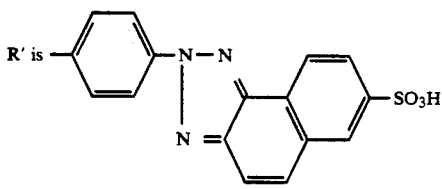

EXAMPLE 14

Light-polarizing sheets having similar good dichroic properties are obtained by replacing in Example 1 Mowiol ® 28-99 by Mowiol ® 40-88 (hydrolyzed polyvinyl acetate; degree of hydrolysis 87.7±1.0 mole %, viscosity of the 4% strength aqueous solution at 20° C.: 40±2.0 mPa·sec$^2$ from Hoechst AG) or by Mowiol ® 4-98 (hydrolyzed polyvinyl acetate; degree of hydrolysis 98.4±0.4 mole %, viscosity of the 4% strength aqueous solution at 20° C.: 4±1.0 mPa·sec$^2$; from Hoechst AG) or by Mowiol ® 66-100 (hydrolyzed polyvinyl acetate; degree of hydrolysis 99.7±0.3 mole %; viscosity of the 4% strength aqueous solution at 20° C.: 66±4.0 mPa·sec$^2$: from Hoechst AG).

EXAMPLE 15

Analogously to Examples 1 and 14, light-polarizing sheets containing the dyestuffs from Examples 2-13 are produced. The sheets obtained are distinguished by good dichroic properties.

We claim:

1. A dyestuff, which, in the form of the free acid, conforms to the formula I:

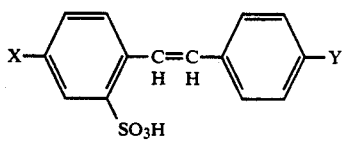

in which

X and Y independently represent N=N—R, CF$_3$, CONH$_2$, CONHR$^1$, CONR$^1$R$^2$, COOH, COOR$^1$, CN, NO$_2$, NH$_2$, NR$^1$R$^2$, NHR$^1$, OH, OR$^1$, NHCOR$^1$, O—CO—R$^1$, or halogen, and R$^1$ and R$^2$ independently represent alkyl, cycloalkyl, aryl or aralkyl, which are uninterrupted or interrupted by O, S or both O and S;

provided that at least one of the radicals X or Y represents N=N—R, in which

R represents an aryl radical of the formula:

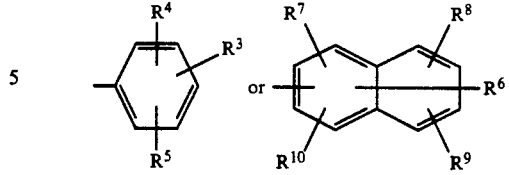

in which

R$^3$ represents H, OH, OR$^1$, NH$_2$, NHR$^1$, NR$^1$R$^2$, NHCOR$^1$, O—CO—R$^1$, or N=N—R$^{11}$, R$^4$, R$^5$, R$^7$, R$^8$, R$^9$ and R$^{10}$ independently represent H, halogen, OH, OR$^1$, NH$_2$, NHR$^1$, NR$^1$R$^2$, R$^1$, SO$_3$H, SO$_2$NH$_2$, SO$_2$NHR$^1$, SO$_2$NR$^1$R$^2$, O—CO—R$^1$, and NH—CO—R$^1$;

R$^6$ represents H or N=N—R$^{11}$; and

R$^{11}$ represents an aryl radical of the formula:

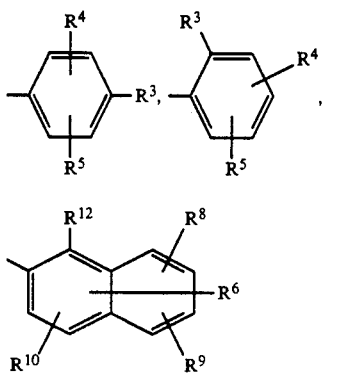

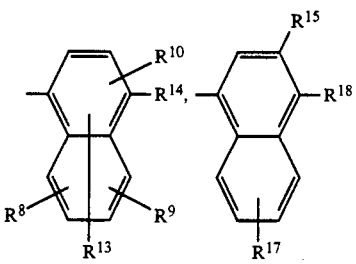

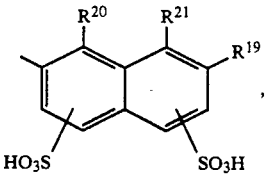

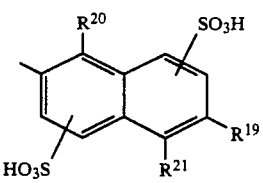

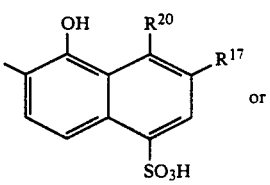

or

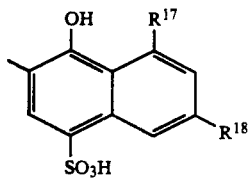

in which $R^{12}$ represents OH or $NH_2$;

$R^{13}$ represents H, if $R^{14}$=N=N—$R^{11}$, and represents N=N—$R^{11}$, if $R^{14}$=OH or $NH_2$;

$R^{14}$ represents OH, $NH_2$ or N=N—$R^{11}$;

$R^{15}$ represents H, OH, $OR^1$, O—CO—$R^1$, $NH_2$, $NHR^1$, $NR^1R^2$, $NHCOR^1$ or $SO_3H$;

$R^{17}$ represents H or $SO_3H$;

$R^{18}$ represents H, OH, $NH_2$, $NHCOR^1$, $NHR^1$, N=N—$R^{11}$, or $SO_3H$;

$R^{19}$ represents H or N=N—$R^{11}$; and $R^{20}$ and $R^{21}$ independently represent OH, $NH_2$, O—CO—$R^1$, or $NHCOR^1$;

and in which the radicals $R^1$ and $R^2$ are unsubstituted or substituted by a substituent selected from the group consisting of halogen, OH, CN and $C_{1-4}$-alkyl where $R^1$ or $R^2$ is alkyl or cyclalkyl or from the group consisting of halogen, OH, $C_{1-4}$-alkoxy, $C_{1-4}$-alkoxy, $CF_3$, $NO_2$ and CN where $R^1$ or $R^2$ is aryl or aralkyl, the dyestuff containing a maximum of eight azo bridges, and with the exception of the dyestuff, which, in the form of its free acid, conforms to the formula I wherein:

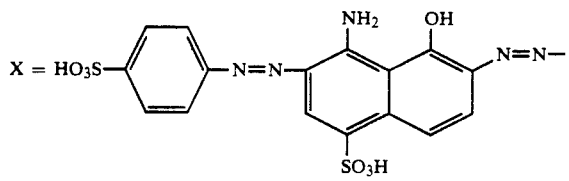

and

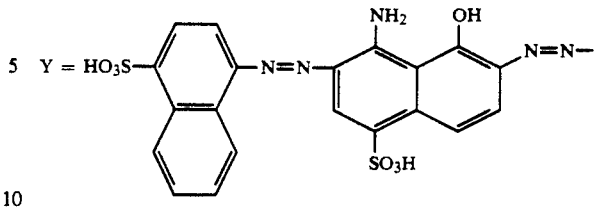

2. A dyestuff according to claim 1 wherein $R^{11}$ represents:

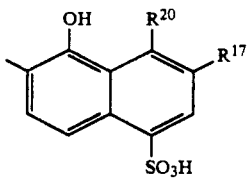

wherein
$R^{17}$ represents H or $SO_3H$; and
$R^{20}$ represents OH or $NH_2$.

3. A dyestuff according to claim 1, wherein R represents:

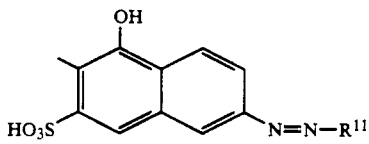

4. Light-polarizing films or sheets containing an organic polymer and a dyestuff or more than one dyestuff according to claim 1.

5. Light-polarizing films or sheets according to claim 4, containing an vinyl alcohol homopolymer or copolymer.

6. Light-polarizing films or sheets according to claim 4, containing 0.01 to 10% by weight of a dyestuff relative to the weight of the film.

* * * * *

UNITED STATES PATENT AND TRADEMARK OFFICE
CERTIFICATE OF CORRECTION

PATENT NO. : 5,272,259
DATED : December 21, 1993
INVENTOR(S) : Claussen, et al.

It is certified that error appears in the above-identified patent and that said Letters Patent is hereby corrected as shown below:

Col. 33, line 62   After " halogen " delete " , " and substitute -- ; --

Col. 34, line 12   After " N=N-$R^{11}$ " delete " , " and substitute -- ; --

Col. 35, line 27   Delete " $C_{1-4}$-alkyl " and substitute -- $C_{1-4}$-alkoxy --

Col. 35, line 28   Delete " cyclalkyl " and substitute -- cycloalkyl --

Col. 35, line 29   Delete " $C_{1-4}$-alkoxy " and substitute -- $C_{1-4}$-alkyl --

Signed and Sealed this

Sixth Day of June, 1995

BRUCE LEHMAN

*Attest:*

*Attesting Officer*   *Commissioner of Patents and Trademarks*